United States Patent

[11] 3,628,775

| [72] | Inventors | Christopher W. McConnell<br>Westmount, Quebec;<br>Robert W. Slater, Nun's Island, Montreal,<br>both of Canada |
|---|---|---|
| [21] | Appl. No. | 799,434 |
| [22] | Filed | Feb. 14, 1969 |
| [45] | Patented | Dec. 21, 1971 |
| [73] | Assignee | Atara Corporation<br>Montreal, Quebec, Canada |

[54] SEWAGE-TREATING SYSTEM
10 Claims, 4 Drawing Figs.

[52] U.S. Cl. .................................................. 261/77,
261/121, 210/220
[51] Int. Cl. ........................................................ B01f 3/04
[50] Field of Search............................................ 210/219,
220; 261/77, 123, 121, 124

[56] References Cited
UNITED STATES PATENTS

| 1,732,893 | 10/1929 | Hunt ............................ | 261/121 |
| 2,144,385 | 1/1939 | Nordell ........................ | 261/122 X |
| 2,825,691 | 3/1958 | Fischer......................... | 210/219 X |
| 3,228,526 | 1/1966 | Ciabattari et al. ............ | 261/124 X |
| 3,246,761 | 4/1966 | Bryan et al.................... | 261/121 X |
| 3,470,092 | 9/1969 | Bernard........................ | 210/220 X |
| 3,476,366 | 11/1969 | Brooks et al................. | 261/123 |

*Primary Examiner*—Tim R. Miles
*Assistant Examiner*—Steven H. Markowitz
*Attorney*—William R. Liberman ABSTRACT: A sewage digestion system includes a liquid-submerged vertical stack with top discharge and bottom inlet openings and an upper section of larger cross section than the lower section and provided with peripherally spaced inlet ports. A generator for bubbles preferably of approximately the cross section of the stack lower section registers with the inlet opening. A torus pipe connected to a low-pressure blower surrounds the stack above the inlet ports and an annular wall surrounds the pipe and extends to the stack below the ports, the pipe being between 1 foot and 3 feet below the liquid level. In the alternative the torus is at about the level of the stack discharge opening and the inlet ports are omitted.

PATENTED DEC 21 1971  3,628,775

INVENTOR
ROBERT W. SLATER
CHRISTOPHER W. McCONNELL
BY
William R. Lieberman
ATTORNEY 3,628,775

SEWAGE-TREATING SYSTEM

BACKGROUND OF THE INVENTION

The present invention relates generally to improvements in liquid-treating devices and it relates particularly to an improved apparatus for the circulation and aeration of a body of liquid for effecting the aerobic digestion of sewage contained therein. In the aerobic digestion of liquid-carried sewage, the sewage solids must be exposed to an oxygen-containing gas to effect such aerobic digestion. When sewage is disposed in a relatively stagnant pool the digestion rate is low by reason of the low availability of oxygen to the sewage and as a consequence large bodies of liquid are required for adequate aerobic digestion. Many expedients have been resorted to in order to increase the sewage digestion rate and hence the digestion capacity per unit volume. Among these expedients are the circulation of the sewage-containing liquid and the injection of air therein. While these expedients increase the aerobic digestion rate they possess numerous drawbacks and disadvantages. The injection of air into the sewage-containing liquid is expensive and inefficient requiring a relatively large power consumption and extensive equipment. The circulation of the liquid in the body thereof by conventional means is likewise expensive and inefficient. In U.S. Pat. Nos. 2,967,399 and 3,246,761 there is described a highly satisfactory apparatus for circulating the liquid in a large body thereof which apparatus includes a vertical stack submerged in the liquid and at the bottom opening of which is located an inverted siphon type of bubble generator which cyclically produces large bubbles of a transverse cross sections commensurate with that of the stack, the rising bubbles functioning as pistons to effect the upward flow of water in the stack and out of the top thereof. While the aforesaid type of water pump is simple, reliable and efficient in the pumping of liquid from the lower to the upper part of the liquid body and increases the aerobic digestion rate, in many cases, particularly where the available storage volume or capacity of sewage liquid is limited and the sewage digestion requirements relatively large, the resulting aerobic digestion rate remains inadequate. Accordingly the sewage digestion systems heretofore employed and proposed leave something to be desired.

SUMMARY OF THE INVENTION

It is a principal object of the present invention to provide an improved method and apparatus for the treatment of liquids.

Another object of the present invention is to provide an improved method and apparatus for the treatment of large liquid bodies with gases.

Still another object of the present invention is to provide an improved method and apparatus for the aerobic digestion of sewage.

A further object of the present invention is to provide an improved apparatus for the aerobic digestion of sewage characterized by its efficiency, simplicity, reliability, low cost and high capacity per unit volume of sewage storage.

The above and other objects of the present invention will become apparent from a reading of the following description taken in conjunction with the accompanying drawing which illustrates preferred embodiments thereof.

In a sense, the present invention contemplates an improved method and apparatus for the treatment of liquids, particularly the aeration of a body of sewage liquid to effect the aerobic digestion thereof, in which the sewage-carrying liquid is vertically circulated in a body thereof by introducing bubbles into the bottom opening of a vertical stack submerged in the liquid body to cause the upward flow of liquid in the stack and the discharge thereof at a stack upper discharge opening whereby a downward liquid flow is effected in the liquid surrounding the stack. Air bubbles are injected in the downward liquid flow at a level not exceeding about 3 feet below the liquid level, and preferably between 20 inches and 3 feet. The bubbles introduced at the stack inlet are at a relatively high pressure depending on the depth of the bubble injection whereas the bubbles introduced in the upper level are at a relatively low pressure permitting the use of simple high-capacity, high-efficiency air blowers such as of the fan type. The low-pressure bubbles are advantageously directed downwardly so as to afford maximum retention of these bubbles in the liquid before release to the ambient atmosphere. The bubbles introduced into the stack inlet are advantageously of a transverse cross section at least one-half that of the stack and preferably approximately that of the stack and function as liquid-raising pistons in the cylinder-defining stack, the bubbles being advantageously cyclically produced by an inverse siphon.

In a simple form of the improved apparatus, the vertical stack is supported atop a frustoconical wall having bottom ports and an inverse siphon bubble generator is positioned in registry with the stack bottom inlet opening. The upper end of the stack is positioned a short distance below the liquid level and a toroidal pipe is located at a level between 1 and 3 feet below the liquid level and surrounds the stack discharge opening and is radially spaced therefrom so as to be disposed preferably in the downward flow of the liquid. Outlet openings are formed in the underface of the toroidal pipe which is connected to a high-capacity low-pressure air blower such as a fan or the like.

According to a preferred form of the improved apparatus the stack includes an upper section of greater transverse cross section than the lower section and having peripherally spaced ports along its lower periphery. The toroidal pipe surrounds the stack upper section and a cylindrical wall surrounds the pipe and extends to the stack below the ports so that the liquid is drawn through the ports into the stack by the rising bubbles to produce a downward liquid flow between the stack and cylindrical wall which draws therewith the bubbles issuing from the pipe. A bubble-retaining annular horizontal baffle extends from the upper edge of the stack and is disposed above and projects beyond the cylindrical wall.

The improved method and apparatus greatly increase the aerobic digestion capacity per unit liquid sewage storage volume over conventional systems and are highly efficient in power consumption. The apparatus is simple, rugged, reliable and of relatively low cost and is easy and simple to operate, maintain and service and is of great versatility and adaptability.

DESCRIPTION OF THE PREFERRED EMBODIMENTS

Figure 1:
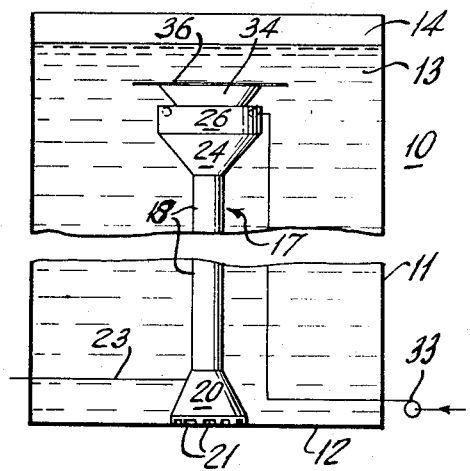
FIG. 1 is a front elevational view of an apparatus embodying the present invention shown in its submerged operative condition.
Figure 2:
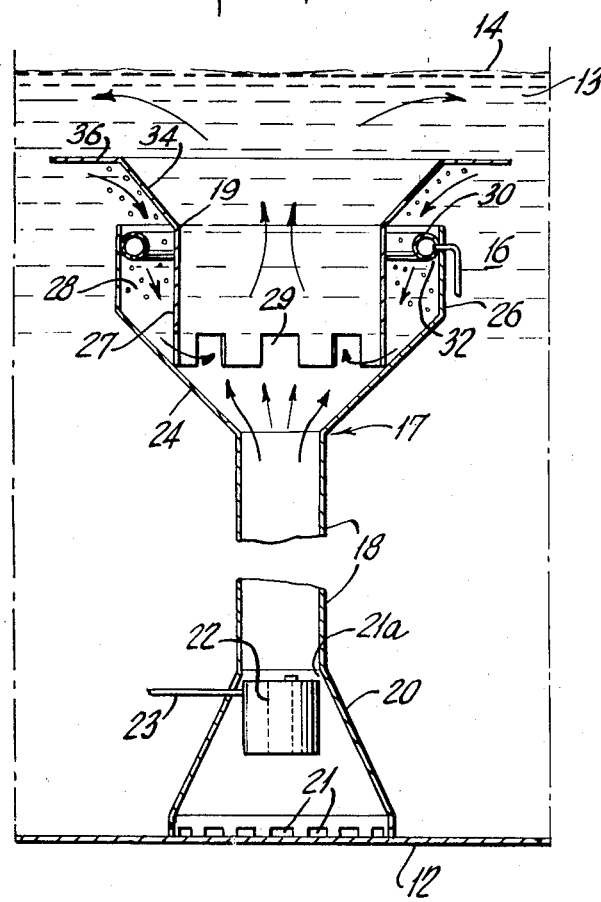
FIG. 2 is a vertical medial sectional view thereof.

Referring now to the drawing, and particularly FIGS. 1 and 2 thereof which illustrate a preferred embodiment of the present invention, reference numeral 10 generally designates the improved system employed in the aerobic digestion of sewage. There may be provided peripheral walls 11 and bottom 12 which delineate a pool or pond 13 of temporarily storaged sewage which is subjected to aerobic digestion. The sewage flows into pool 13 and the treated effluent flows from pool 13, which is maintained at a predetermined level 14, in the known manner as is common practice in the aerobic digestion of sewage.

Submerged in pool 13 and resting on the bottom 12 are one or preferably a plurality of liquid circulating and aerating devices 16 constructed in accordance with the present invention, the devices 16 being distributed through the extent of the pool, the number and arrangement depending on the size and configuration of the pool and the volume of sewage being treated. Each device 16 comprises a vertical stack 17 including a long cylindrical lower section 18 and an upper coaxial section 19 of greater transverse cross section than the stack lower section 18. The lower section 18 of stack 16 is mounted atop a coaxial substantially frustoconical base-defining wall 20 which may be integrally formed with stack section 18 and rests on bottom 12. A plurality of peripherally spaced inlet ports 21 are formed in the bottom border of base 20, stack lower section 18 communicating with the bottom of pool 13 by way of base 20 and ports 21.

Positioned in base 20 directly below and in registry with the bottom inlet opening 21a of the lower section 18 of the stack is a suitably mounted, large bubble generator 22, advantageously of the inverted siphon type as described in the above-identified patents or in copending U.S. Pat. application Ser. No. 780,722 filed Dec. 3, 1968. Bubble generator 22 has a bubble discharge opening directed to stack inlet opening 21a, and is so dimensioned as to produce bubbles of a diameter at least one-half that of stack lower section 18 and preferably approximately equal to or slightly greater than such stack section diameter. The bubble generator 22 is connected by a pipe 23 to a suitable source of compressed air of a pressure at least equal to the liquid pressure at the level of generator 22 to permit the delivery of air thereto. The air is delivered to bubble generator 22 at a rate to effect the cyclical production of bubbles at the desired frequency, advantageously between about 10 and 20 per minute.

An upwardly outwardly inclined conical wall 24 projects from the upper edge of stack lower section 18 and terminated in an upwardly directed vertical cylindrical wall 26. The stack upper section 19 includes a lower cylindrical wall 27 of a diameter between that of stack lower section 18 and cylindrical wall 26 and rests on conical wall 24. The upper edge of cylindrical walls 26 and 27 are at about the same level and define with the upper part of conical wall 24 an annular open-topped conduit 28 which is closed at its bottom. Communication between annular conduit 28 and stack upper section 19 is afforded by a plurality of perspherically spaced inlet ports 29 formed in the bottom border of cylindrical wall 27.

A torus-shaped pipe 30, coaxial with and positioned in the upper part of annular conduit 28, is suitably secured to cylindrical wall 26. Formed in the underface of pipe 30 are peripherally spaced air outlet orifices 32 which are advantageously alternately oppositely staggered 45° from the vertical. The orifices 30 are advantageously of a diameter of about 0.1 (one-tenth inch) and are preferably spaced about 1 inch apart and should have a maximum pressure drop corresponding to about 2 inches of water.

Pipe 30 is connected to the outlet of an air blower 33 of a high-capacity low-pressure type, such as a fan or the like, which produces an outlet air pressure corresponding to about 3 feet of water. Such air-moving equipment is efficient, reliable and inexpensive.

Projecting upwardly from the upper edge of cylindrical wall of 27 is an upwardly diverging conical wall 34 which terminates at a point in vertical alignment with cylindrical wall 26 and is provided at its top with an outwardly directed horizontal annular flange or baffle 36. The top of conical wall 34 delineates discharge opening 37 of stack 17.

Considering now the operation of the improved apparatus in the aerobic digestion of sewage device 16 is submerged in pool 13 and rests on bottom 12. Device 16 is of such height that bubble injector pipe 30 is no more than about 3 feet below pool level 14 and advantageously between 1 and 3 feet below such level. As successive bubbles are produced by generator 22 they enter inlet opening 21 and rise in stack lower section 18, and individually filling the transverse cross section of stack lower section 18, they function as piston to raise the liquid in the stack. The liquid which is raised in stack section 18 is drawn from the bottom of pool 13 through base inlet ports 21 and carries the entrained solids therewith. As the bubbles rise in stack section 18 they expand in volume by reason of the decreasing pressure thereon and as they leave stack lower section 18 and enter enlarged stack upper section 19 they expand in diameter and function as vertically rising pistons in stack upper section 19. A suction is accordingly produced at ports 29 into stack section 19 to draw liquid therein downwardly through conduit 28. Small air bubbles are injected by pipe 30 through orifices 32 into the downward-flowing liquid in conduit 28. Advantageously, the flow of liquid in conduit 28 is of the order of about 10 inches per second. At this liquid flow rate the bubbles, by reason of their tendency to rise, will in part rise slowly counter to the liquid flow and in part travel slowly in the direction of liquid flow. The parameters and dimensions are such that the small bubbles are retained for a maximum time in the liquid so as to achieve a maximum oxygen transfer to the liquid phase. The release of the countercurrent-flowing bubbles is further delayed by annular baffle 36.

The diameter of stack lower section 18 is advantageously between 1 and 2½ feet, with the height thereof depending on the depth of the pool 13 and being such as to locate the pipe 30 between 1 and 3 feet, preferably between 20 inches and 3 feet below pool level 14. The aggregate area of ports 21 are advantageously twice the transverse cross-sectional area of stack lower section 18 and that of ports 29 is twice the transverse cross-sectional area of stack upper section 19 at wall 27. As set forth above, the diameter of cylindrical wall 27 is such that the rising bubbles produced by generator 22 function as pistons therein and the diameter of cylindrical wall 26 is such that the downward liquid flow in conduit 28 is of the order of 10 inches per second. The diameter of cylindrical wall 27 is advantageously between 2 and 4 feet and the radial distance between cylindrical walls 26 and 27 is advantageously between 4 and 12 inches. The amount of air injected into the liquid by the pipe 30 is advantageously between 100 and 1,000 s.c.f.m. and a pipe 30 of about 6-inch diameter and provided with orifices 32 arranged and dimensioned as described above is highly suitable.

Figure 3:
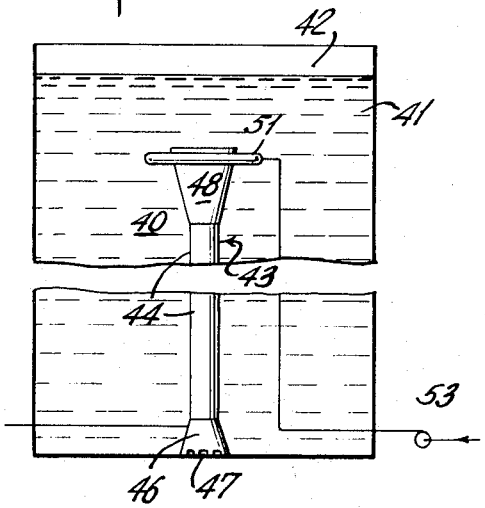
FIG. 3 is a view similar to FIG. 1 of another embodiment of the present invention.
Figure 4:
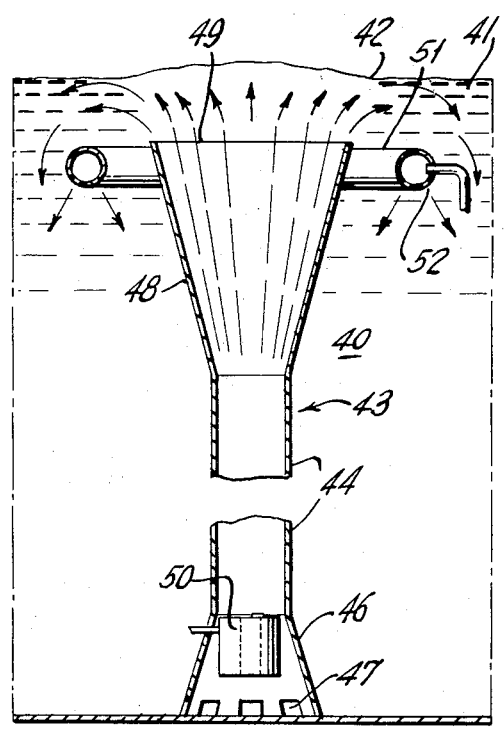
FIG. 4 is a vertical medial sectional view thereof.

In FIGS. 3 and 4 of the drawing there is illustrated another embodiment of the present invention which is of simpler construction than that first described. Specifically, an aeration and circulating device 40 embodying the present invention is submerged in a digestion pool 41, corresponding to pool 14, and having a liquid level 42. Device 40 comprises a vertical stack 43 including a lower main cylindrical section 44 mounted atop a frustoconical, base-defining wall 46. The base 46 rests on the pool bottom and is provided at its bottom border with peripherally spaced inlet ports 47.

The upper section 48 of stack 43 preferably, but not necessarily, diverges upwardly and terminates in a top discharge opening 49 positioned below liquid level 42. A large bubble generator 50, connected to a source of compressed air, registers with the bottom opening of stack lower section 44 and functions in the manner of bubble generator 22 to cyclically introduce piston-defining bubbles into stack 43.

Suitably supported coaxial with and slightly below the level of discharge opening 49 is a torus-shaped pipe 51 of the general construction of pipe 30 and provided in its underface with peripherally spaced bubble discharge orifices 52 corresponding to orifice 32. Pipe 51 is connected to the output of a low-pressure air blower 53 such as for feeding air to pipe 51 at a pressure less than the air pressure to bubble generator 50. The diameter of the pipe torus 51 is greater than that of the discharge opening 49 and pipe torus 51 is located between 1 and 3 feet and preferably between 20 inches and 3 feet below liquid level 42. The operating parameter and dimensions of the device 40 are such that the bubbles are injected by pipe 52 into the pool 41 in the area of downward liquid flow as effected by the device 40 in the surrounding liquid. The downward liquid flow in the area of bubble injection is advantageously of the order of 10 feet per second to assure maximum bubble retention. The various dimensions and operating parameters of the device 40 correspond to the respective dimensions and operating parameters of the device 10.

While there have been described and illustrated preferred embodiments of the present invention, it is apparent that numerous omissions, additions and alterations may be made without departing from the spirit thereof.

I claim:

1. A system for treating sewage in a liquid body at a predetermined level comprising a vertically extending stack positioned in said pool and having a lower inlet opening and an upper discharge opening below said predetermined level, first means for cyclically generating and feeding successive relatively larger bubbles into the lower part of said stack of transverse cross section at least half that of said stack to effect the upward circulation of liquid in said stack and through said discharge opening to effect the flow of liquid in the proximity of said discharge opening, a pipe extending peripherally about said discharge opening at a level between 1 and 3 feet below said liquid body level and having outlet orifices in and spaced along the length of the underface of said pipe, and a low-pressure air blower having an outlet connected to said pipe.

2. The system of claim 1 wherein said pipe is a torus positioned no higher than the level of said discharge opening.

3. The system of claim 1 wherein said stack includes upper and lower sections, said upper section having a transverse cross-sectional area greater than that of said lower section.

4. The system of claim 3 wherein said stack upper section has an inlet port formed therein below said discharge opening and providing communication between said stack and the surrounding liquid body.

5. A liquid-treating apparatus comprising a vertically extending stack having a lower inlet opening and an upper discharge opening and including a lower section and an upper section of greater transverse cross-sectional area than that of said lower section, means for cyclically producing and releasing relatively high-pressure bubbles into said stack lower section of a transverse cross-sectional area at least one-half that of said lower section, a pipe having outlet orifices formed therein located proximate said discharge opening, a relatively low-pressure blower having an outlet connected to said pipe and wherein said stack upper section has inlet ports formed therein below said discharge opening.

6. The apparatus of claim 5, including a frustoconical base-defining wall having inlet openings along its lower border, said stack being coaxially mounted on said base and communicating with the interior thereof.

7. A liquid-treating apparatus comprising a vertically extending stack having a lower inlet opening and an upper discharge opening and including a lower inlet opening and an upper discharge opening and including a lower section and an upper section of greater transverse cross-sectional area than that of said lower section and having inlet ports formed therein below said discharge opening, means for cyclically producing and releasing bubbles into said stack lower section of a transverse cross-sectional area at least one-half that of said lower section, a pipe having outlet orifices formed therein located proximate said discharge opening, a blower having an outlet connected to said pipe, and an annular wall radially spaced from and extending about said stack upper section and extending above said inlet port and having a lower portion extending to said stack below said inlet ports, said pipe being of torus shape and positioned between said cylindrical wall and said stack above said inlet ports.

8. The apparatus of claim 7 including a baffle projecting outwardly from the upper periphery of said stack upper section and positioned above the upper edge of said annular wall.

9. A system for treating sewage in a liquid body at a predetermined level comprising a vertically extending stack positioned in said pool and having a lower inlet opening and an upper discharge opening below said predetermined level and including a lower section and an upper section of greater transverse cross-sectional area than that of said lower section, said stack upper section having inlet ports formed therein around the periphery thereof below said discharge opening, a cylindrical wall surrounding and outwardly spaced from said stack upper section and extending along said inlet ports, first means for cyclically generating and feeding successive relatively larger bubbles into the lower part of said stack of transverse cross section at least half that of said stack to effect the upward circulation of liquid in said stack and through said discharge opening to effect the flow of liquid in the proximity of said discharge opening, a torus-shaped pipe positioned between said stack upper section and said cylindrical wall and having discharge orifices formed therein and a blower having an outlet connected to said pipe.

10. The system of claim 9, including a horizontal baffle projecting outwardly from the upper periphery of said stack upper section and positioned above the upper edge of said cylindrical wall.

* * * * *